United States Patent [19]
Born

[11] Patent Number: 4,631,856
[45] Date of Patent: Dec. 30, 1986

[54] HOOK AND LURE STORAGE DEVICE

[76] Inventor: Perry A. Born, 728 S. Devoe St., Olympia, Wash. 98501

[21] Appl. No.: 785,270

[22] Filed: Oct. 7, 1985

[51] Int. Cl.⁴ ............................................. A01K 97/06
[52] U.S. Cl. ................. 43/57.1; 206/315.11; 43/57.2
[58] Field of Search ............... 43/57.1, 57.2; 224/920; 206/315.11

[56] References Cited

U.S. PATENT DOCUMENTS

| Re. 10,598 | 5/1885 | Price | 43/57.1 |
| 2,597,304 | 5/1952 | Dillingham | 43/57.2 |
| 2,791,863 | 5/1957 | Sweeney | 43/57.2 |
| 2,826,856 | 3/1958 | Marion | 43/57.2 |
| 3,122,855 | 3/1964 | Collier | 43/57.2 |
| 3,490,168 | 1/1970 | Posavec | 43/57.2 |
| 3,512,295 | 5/1970 | Barge | 43/57.1 |
| 3,564,755 | 2/1971 | Lindgren | 43/57.2 |
| 3,729,856 | 5/1973 | Ziemba | 43/57.1 |
| 3,747,258 | 7/1973 | Maciel | 43/57.1 |

Primary Examiner—Kuang Y. Lin
Assistant Examiner—Kurt Rowan
Attorney, Agent, or Firm—Brian J. Coyne

[57] ABSTRACT

A holder for storage of fishing rigs. The rigs consisting of a pretied hook, a leader, a lure, a length of rubber tubing and a swivel tied to the end of the leader. The holder is provided with a storage compartment for storing lead used to weight down the rig. The body is provided with a blade for the purpose of cutting fishing line.

1 Claim, 4 Drawing Figures

HOOK AND LURE STORAGE DEVICE

BACKGROUND OF THE INVENTION

The present invention relates to a device for storing rigs; such rigs typically include a pretied hook, a leader, a lure, a one inch piece of rubber tubing, and a swivel. The device is designed to store for convenient access several rigs, each of which can include a variety of different components.

Fishing rigs in particular the type with long leaders and a variety of components are a chore to assemble on the river and often in freezing temperatures. Once a fishing rig is lost the fisherman must perform six steps before fishing can resume. A hook must be tied to a leader 15 to 24 inches long. A lure must be strung on the leader. A swivel must be tied to the end of the leader opposite the hook. A one inch piece of rubber tubing, used as a weight securing means, must be strung on the fishing line to the pole. The swivel must be tied to the fishing line and a 2 to 3 inch piece of lead must be inserted into the rubber tubing. Once these tasks are completed fishing can resume. This operation can take as long as 10 minutes and it is common to have to be performed sometimes a dozen times in a days fishing. The fisherman's fingers are often numb from the cold and the process is painful and difficult. The need for a convenient, compact storage device for pretied fishing rigs comprising a hook, a long leader, a lure, a piece of rubber tubing and a swivel tied to the opposite end of the leader has long been recognized by fishermen. Since fishermen usually desire a quick change of rigs when fishing a compact holder for such rigs would be beneficial to the fisherman.

PRIOR ART

Anderson disclosed a hook holder for supporting fishing rigs having a hook at one end and a leader with a swivel at the other end. U.S. Pat. No. 4,281,470 (Aug. 4, 1981). Anderson achieved storage of a plurality of rigs by providing a plurality of penetrable faces for insertion of one or more ganged hooks, a locator for the swivel of each of the ganged hooks remote from such faces, and a guide for the leaders of the rigs. Because the leader was wrapped but once around the holder, the holder was inconveniently large.

Pipkin described a hook and leader storage container of novel and compact design. U.S. Pat. No. 4,036,451 (July 19, 1977). Pipkin provided a cylindrical container having a detachable lid, a rotatable hub within the container, and a penetrable hook anchoring pad. In use, the barbed end of a hook would be inserted into the pad, and the leader would be drawn through a port in the side of the container. Rotation of the lid would cause the leader to wind inward. Pipkin's device holds a plurality of hooks and leaders with nothing else strung on the leaders.

Barnes describes a container for carrying fishing lures. U.S. Pat. No. 4,208,825 (June 24, 1980). Barnes's design holds spinner or spoon type lures and is a pocket sized container. These lures have no attached leaders.

Hearing describes a hook and leader storage structure. U.S. Pat. No. 3,881,273 (May 6, 1975). Hearing provides a hook support member and leader engaging members. Hearing's design holds hooks and leaders of short lengths separately.

OBJECT OF THE INVENTION

It is, therefore, one of the objects of the invention to provide a holder for pretied fishing rigs.

Another object is to provide a fishing rig holder for holding the rigs individually with the leaders in a protective groove to limit possible flawing.

A further object of the invention is to provide a storage compartment for storing lead to use as weight.

An additional object of the invention is to provide a cutting blade to cut fishing line.

Another object of the invention is to provide the holder in a compact size to enable the fisherman to carry the holder in a shirt or jacket pocket.

DETAILED DESCRIPTION OF THE INVENTION

Figure 1:
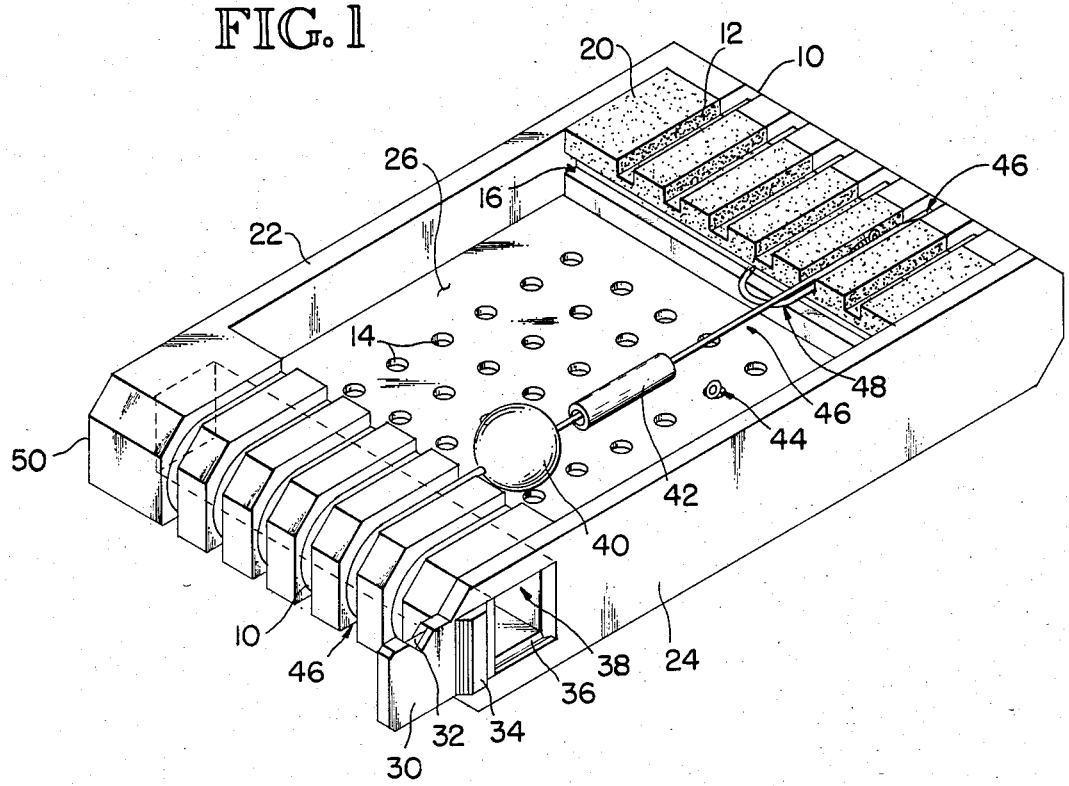
FIG. 1 is a perspective view of a storage device embodying the present invention showing the commencement of the storage operation.

Referring to the drawings, it is seen that the device of the present invention comprises a holder (50), lure and tubing storage zone (26), a hook holding means (20), a swivel securing means (28), leader guides (10), left and right side walls (22) and (24), lead storage compartment (38) with door (30), and cutting blade (32). The holder (50) is molded with rounded corners, suitable for carrying in a pocket.

Figures (26), (10), (22), (24), (38), and (30) may be formed of a suitable plastic such as polyethylene and the hook holding means (20) may be formed of a suitable rubber for receiving and anchoring the barbed end of the hook (48), having an attached leader (46), an attached lure (40), an attached rubber tubing (42), and a pretied swivel (44). The holder (50) is preferably rectangular and of dimensions to fit into a shirt of jacket pocket. The interior of the holder (26) serves as a lure and rubber tubing storage zone with side walls (22) and (24) to contain the stored fishing lures having a hook (48) pretied to a leader (46) on which a lure (40) is strung and also which a piece of rubber tubing (42) is prestrung along with which a swivel (44) is pretied. For securing the swivel (44) a swivel storage aperture (14) is provided. At least 6 alternate swivel storage apertures are provided for each stored rig. Each set of swivel storage apertures is set in cooperation with an individual set of corresponding hook storage grooves (12), and top and bottom leader guides (10).

It will be noted that the lower end of the holder (50) opposite said hook holding means (20) is provided with a lead storage compartment (38). The lead storage compartment (38) is provided with a door (30) and side wall (24) is provided with door guides (36) at top and bottom. Corresponding stubs will preferably project upwardly and downwardly from the door (30) to allow a sliding of the door (30). Said door (30) is provided with a thumb grip (34) for use in manually opening and closing said storage door (30). The top portion of the door (30) is further fitted with a cutting blade (32) to be used for cutting fishing line.

Figure 2:
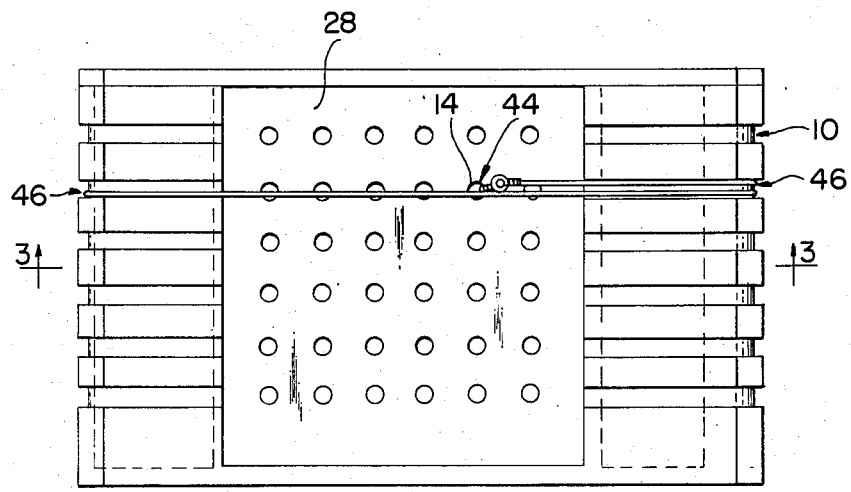
FIG. 2 is a bottom plan view illustrating completion of the storage operation.
Figure 3:
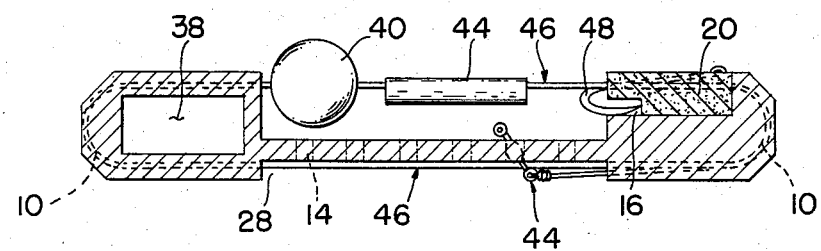
FIG. 3 is a vertical sectional view illustrating the stored rig in completion; and illustrating the swivel storage means along line 3—3 of FIG. 2.
Figure 4:
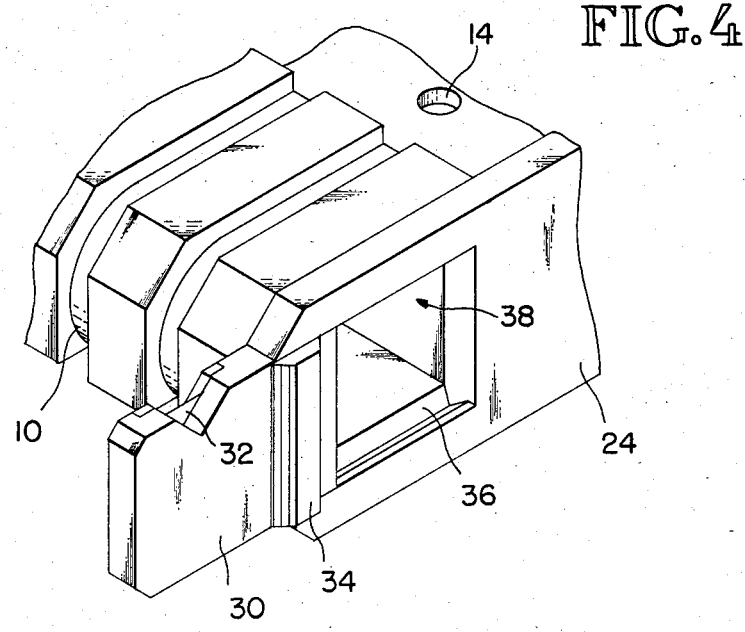
FIG. 4 is an exploded perspective view illustrating the lead storage compartment, storage door and cutting blade construction.

The manner in which a rig is placed in storage position is illustrated in FIG. 2 and FIG. 3 and will now be described. With the lure completely pretied to a leader of desired length, the barbed end of the hook (48) is inserted into hook anchoring slot (16). The shank of the hook (48) is inserted into the hook storage groove (12). The leader (46) is drawn around the top and bottom leader guide (10) by inserting the leader (46) into the collinear grooves therein, placing the lure and the tubing into the storage zone (26), wrapping the remaining leader (46) around the top leader guide (10), and inserting the swivel (44) into an aperture. The leader (46) is again aligned in the same leader guide in cooperation with its respective hook storage groove (12). The remaining leader (46) with the pretied swivel (44) is moved to the back surface of the holder. A suitable swivel storage means (14) is selected just beyond the reach of the swivel, a small amount of tension is now applied to the leader (46) and the swivel (44) is inserted into the swivel securing means (14). The applied pressure holds the swivel and the entire rig in the stored position.

To remove the rig simply reverse the storage operation. To complete the task of re-rigging the fishing pole one knot needs to be tied to join the rig to the fishing line. Once the knot is tied to the swivel (44) the rubber tubing is slid up over the swivel onto the line to the pole. A piece of lead is inserted in the rubber tubing and fishing can resume.

From the foregoing description it is seen that the elements of the invention cooperate in a novel manner to give a compact storage device and make both insertion and removal of hook, lure, tubing, leader, and swivel rigs easy to accomplish. In addition to storage of the lure, storage of lead is compact and convenient. The convenience of a cutting tool adds to the usefulness of the invention and hence the annexed claims are to be interpreted accordingly.

The embodiments of the invention in which a particular property or privilege is claimed are defined as follows:

1. A pocket-sized holder for storing fishing rigs, each rig comprising leader having a hook at one end and a swivel at its other end, and lure and tubing strung on the leader between the hook and the swivel, the holder having front and back surfaces and comprising:
　(a) hook holding means;
　(b) lure and tubing storage zone;
　(c) swivel securing means;
　(d) top leader guide means;
　(e) bottom leader guide means;
　(f) compartment for storing leads;
　(g) door for the said compartment;
　(h) cutting blade;
wherein the storage zone is interposed between the hook holding means and the bottom leader guide means, the hook holding means has a plurality of parallel grooves in the upper surface of the holder and an anchoring slot for receiving the barbed ends of a plurality of hooks, the storage zone includes a recessed portion having a plurality of apertures, and the top and bottom leader guide means have a plurality of parallel groves extending from the front surface around to the back surface of the holder, each grove of the hook holding means being collinear with a groove in the top and bottom leader guides means, the door is mounted on one end of the compartment for reversible access to leads stored therein, the cutting blade is mounted on the door such that its cutting edge is exposed for cutting fishing line only when the door is in an open position, such that in use a fishing rig is stored in the holder by inserting the barbed end of the hook into the slot with the shank of the hook inserted into a groove in the hook holding means, drawing the leader around the top and bottom leader guide means by inserting the leader into the collinear grooves therein, placing the lure and the tubing into the storage zone, wrapping the remaining leader around the top leader guide means, and inserting the swivel into an aperture.

* * * * *